United States Patent [19]

Dolfi

[11] Patent Number: 4,597,349
[45] Date of Patent: Jul. 1, 1986

[54] AUTOMATIC PILOT FOR SAILBOAT

[76] Inventor: James W. Dolfi, 19771 Cooley, Detroit, Mich. 48219

[21] Appl. No.: 504,962

[22] Filed: Jun. 16, 1983

[51] Int. Cl.⁴ .......................................... B63H 25/02
[52] U.S. Cl. ............................ 114/144 A; 114/144 R; 33/363 K
[58] Field of Search ........ 114/144 RE, 144 A, 144 E; 33/363 K, 360; 73/178 R; 318/640; 350/433

[56] References Cited

U.S. PATENT DOCUMENTS

| | | | |
|---|---|---|---|
| 1,885,098 | 10/1932 | Hill | 33/363 K |
| 2,790,913 | 4/1957 | Stamper et al. | 33/363 K |
| 3,237,584 | 3/1966 | Keithley, Jr. | 114/144 RE |
| 3,280,781 | 10/1966 | Koerner | 114/144 RE |
| 3,529,117 | 9/1970 | Costello | 350/433 |
| 3,896,362 | 7/1975 | Street | 318/640 |
| 3,952,681 | 4/1976 | Tucker | 114/144 A |
| 4,023,018 | 5/1977 | Hall | 114/144 E |
| 4,059,064 | 11/1977 | Dickey | 114/144 E |
| 4,095,348 | 6/1978 | Kramer | 33/363 K |
| 4,416,066 | 11/1983 | Romacker | 33/363 K |

FOREIGN PATENT DOCUMENTS

| | | | |
|---|---|---|---|
| 1372430 | 12/1964 | France | 33/363 K |
| 440243 | 12/1935 | United Kingdom | 114/144 E |

Primary Examiner—Trygve M. Blix
Assistant Examiner—Edwin L. Swinehart
Attorney, Agent, or Firm—Charles W. Chandler

[57] ABSTRACT

A control apparatus is disclosed for a sailboat automatic pilot comprised of a rotatable drum connected to a compass member, the drum having a series of light-reflective and light-absorbent stripes. A light source located adjacent to the drum illuminates the drum surface. A pair of light detectors provide signals to circuits which detect the transition between the light-reflective and light-absorbent stripes and determine the direction of rotation of the drum to provide corrective signals to a steering actuator.

7 Claims, 7 Drawing Figures

AUTOMATIC PILOT FOR SAILBOAT

BACKGROUND OF THE INVENTION

This invention is related to automatic steering apparatus employing control means for detecting the direction of rotation of a compass member to determine the difference between a selected compass direction and the actual boat heading, to provide a compensating signal to a steering actuator, and more particularly to an apparatus for controlling power between a power source and the actuator with means for detecting the direction of rotation of a drum and counting the number of light-absorbent and light-reflective areas along the surface of the drum as the boat's heading deviates with respect to a given compass heading.

Some conventional automatic steering apparatus for boats and the like employ an optical device that senses the relative motion between a flat compass disk and the boat in such a manner as to automatically energize a steering member to compensate for the error in boat heading. Conventional units have considerable hunting and are somewhat insensitive to slight changes in course. Usually the disk and the light source must be mechanically repositioned when the boat's course is changed.

SUMMARY OF THE INVENTION

The broad purpose of the present invention is to provide means for either automatically or manually steering a vessel from a convenient location employing an optically encoded compass drum that is movable with respect to a pair of spaced, light-emitting devices. The drum has a series of light-reflective and light-absorbent areas. The compass assembly contains two light emitting devices which radiate light in the infrared spectrum (I-R). The I-R emitters focus their radiation on the surface of the compass drum. The emitters are used in combination with photodetectors having a peak response in the I-R spectrum.

Preferably the light is developed by solid state light emitting diodes (LED) which will withstand high mechanical shock and have inherently longer operating life than conventional incandescent light sources.

The photodetectors are focused on areas of the compass drum illuminated by the LEDs. Two LEDs and two photodetectors are used in the preferred compass assembly although a single light emitter may be used. One LED and one photodetector comprise a transmitter-detector for each channel. Two transmitter-detector channels are contained in the sensing assembly.

The light incident on the compass drum is either attenuated by absorbing areas or returned by reflective areas. The detectors respond to the light reflected from the compass drum by changing resistance in proportion to the amount of light received. The detectors are placed in a resistor network connected to the power source. The resistor network comprises a voltage divider which produces a voltage output that is proportional to the change in resistance of the detector. The output of the voltage divider is applied to an amplifier circuit which controls the speed of a motor connected to the steering actuator of the boat to drive a linear actuator connected to the tiller or steering quadrant.

The apparatus can be adjusted to respond to wind and sea conditions, and can be easily overridden by the user without turning off the control. The user can set a new course merely by steering the vessel to the desired course bearing and setting the unit for automatic operation.

Still further objects and advantages of the invention will become apparent to those skilled in the art to which the invention pertains upon reference to the following detailed description of the preferred embodiment.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
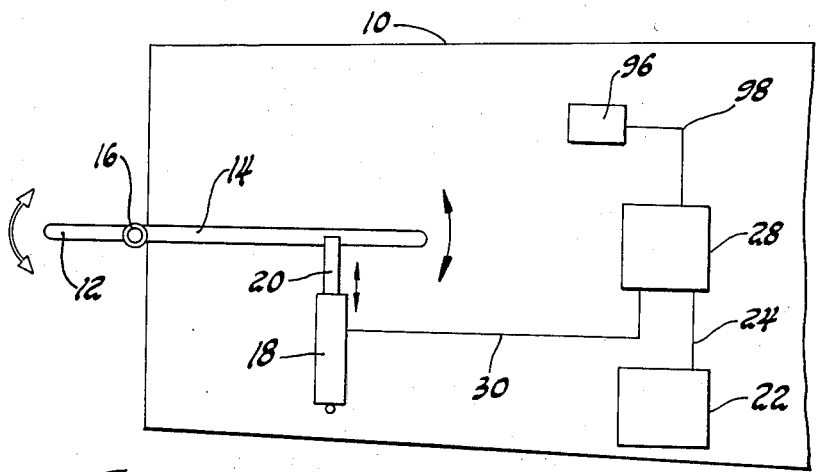
FIG. 1 is a fragmentary, partially schematic view of a boat having steering apparatus connected to automatic control apparatus illustrating the preferred embodiment of the invention.

Referring to the drawings, FIG. 1 illustrates sailboat 10 having a steering rudder 12. A conventional tiller 14 is connected by post means 16 to the rudder.

Linear actuator 18 is mounted on the boat and connected to the tiller for moving it in a direction depending upon whether actuator rod 20 is being extended or retracted. A power source 22, comprising the boat's battery, is connected by means 24 to control means 28. Control means 28 is connected between the actuator and the power source. Control means 28 is connected by means 30 to actuator 18 and controls power to the actuator motor.

Figure 2:
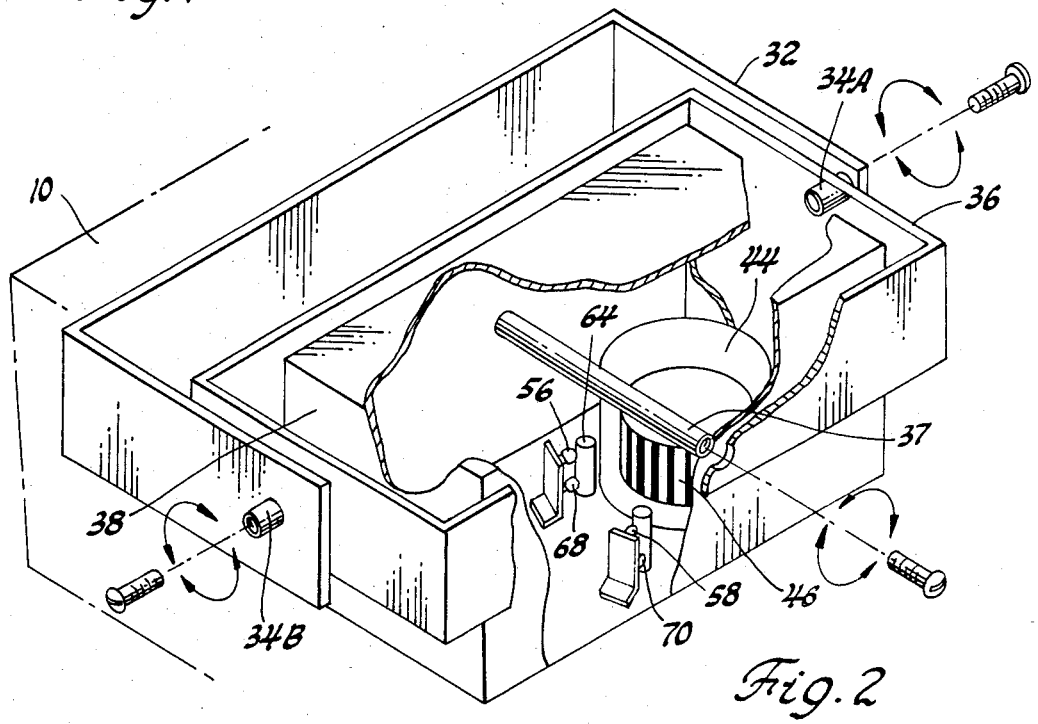
FIG. 2 is a fragmentary view of the drum and gimbal assembly.

Referring to FIG. 2, the mechanical portion of the control means includes a bracket 32 attached to boat frame 10. Bracket 32 has a U-shaped configuration and supports a pair of aligned pivot members 34A and 34B. A rectangular support 36 is pivotally mounted on pivot members 34A and 34B. Support rod 37 has its ends connected to opposite sides of support 36. Sealed housing 38 is pivotally mounted on support rod 36 so as to assume a relatively stable horizontal position regardless of the motion of the boat.

Figure 3:
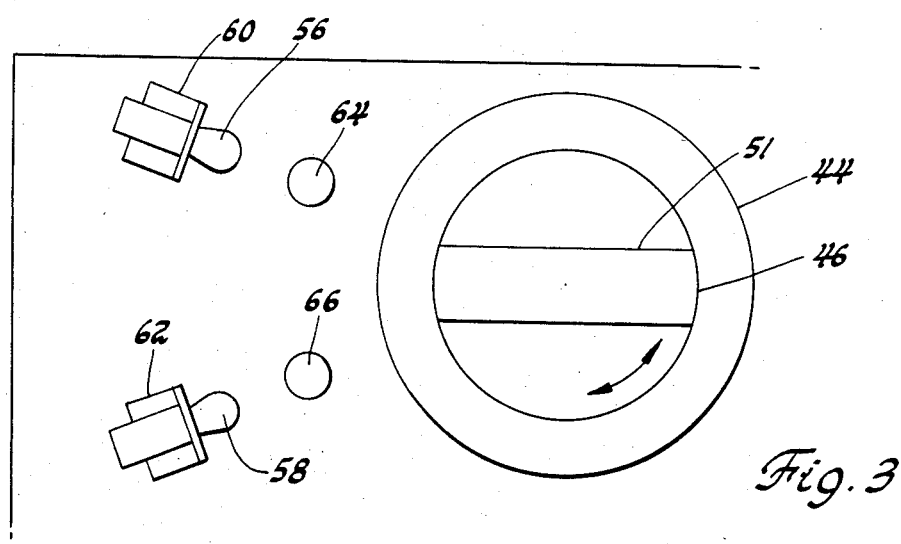
FIG. 3 is a plan view illustrating the relationship between the light emitters and the drum.
Figure 4:
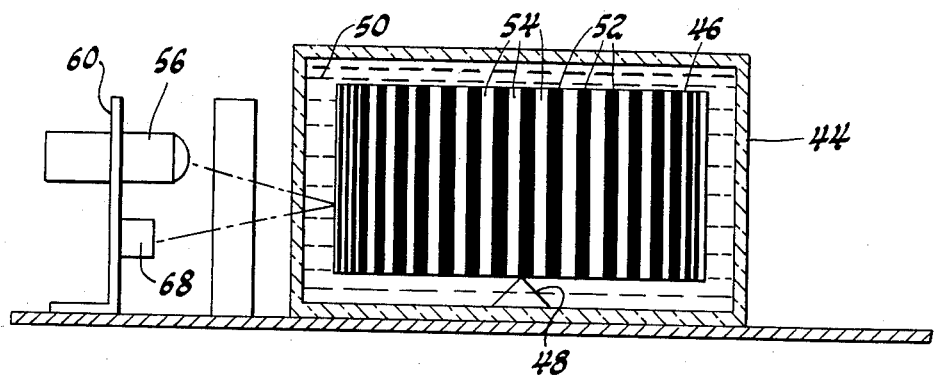
FIG. 4 is an elevational view of one of the light emitters and the drum.

Referring to FIGS. 2-4, a cylindrical housing 44 of transparent plastic is mounted on the base of housing 38. Drum 46 is mounted on pivot 48 in the housing so that the drum can be rotated in either the clockwise or counter-clockwise direction, as viewed in FIG. 3.

The surface of the drum is visible through transparent housing 44. A viscous liquid 50 fills the housing to dampen the drum motion. Magnetic compass member 51 is carried by the drum to bias it toward a position dictated by the earth's magnetic field. The drum moves with the compass member whereas the housing moves with the boat.

The surface of the drum is coated with 36 spaced stripes 52. Stripes 52 absorb radiation and are equally spaced. The number of stripes determines the angular resolution of the compass.

The reflective portion of the drum between each pair of stripes 52 reflects infra-red radiation. The space between each pair of stripes 52 is referred to as a stripe 54.

Referring to FIGS. 3 and 4, a pair of light emitters 56 and 58 are mounted on circuit board and bracket means 60 and 62, respectively. Each light emitter is adapted to radiate infrared light toward the drum through a pair of transparent rods 64 and 66. The light emitters are solid state light emitting diodes. Rods 64 and 66 function as lens to focus the light from the emitters into a focal line to intensify the illumination in an area parallel to the reflective stripes on the drum.

Housing 38 also supports a pair of photo detectors 68 and 70 located beneath light emitters 56 and 58, respectively. Each detector is focused through its corresponding lens on that portion of the drum illuminated by its corresponding emitter to receive the highest intensity signal for any given power input to the emitter.

Figure 5:
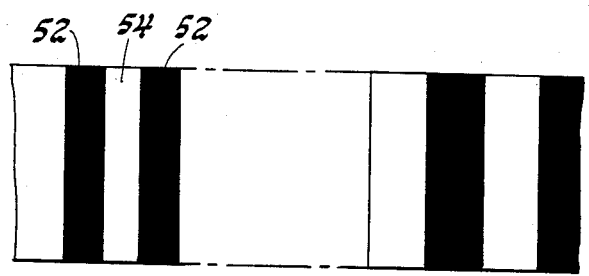
FIGS. 5 and 6 illustrate the relationship between the motion of the light detector and the drum.
Figure 5:
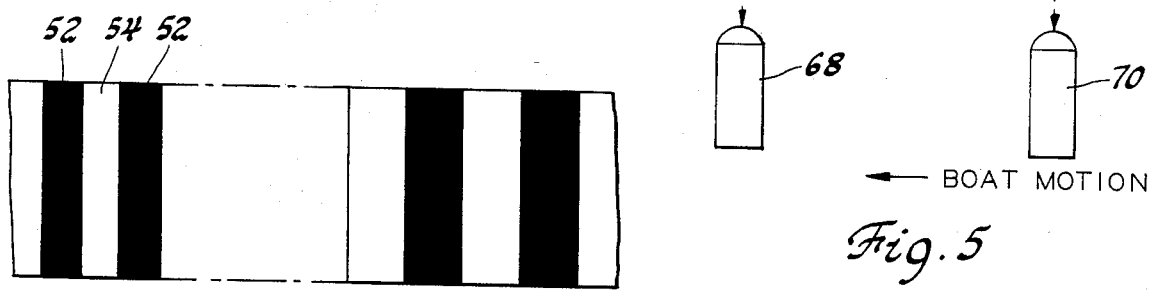
Figure 6:
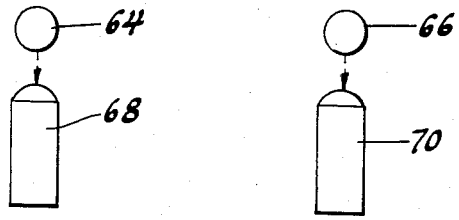

Referring to FIGS. 5 and 6, the photo detectors are spaced with respect to the stripes on the drum in such a manner that when photo detector 70 is aligned with the mid-section of a light absorbing stripe, photo detector 68 is aligned with the edge between a light-absorbing stripe and a light-reflective stripe.

Assuming the drum is disposed in a relatively stable position with respect to the surface of the earth, and the boat heading shifts from a predetermined course, the photo detectors are rotated with respect to the drum. The direction of boat motion can be precisely determined by a signal transmitted by photo detector 68 sensing the edge between a light-absorbing area and a light-transmitting area, while photo detector 70 continually senses a light-absorbing area. The signals generated by the two detectors are employed to determine the direction of steering error while the number of stripes is used to determine the amount of steering error.

Figure 7:
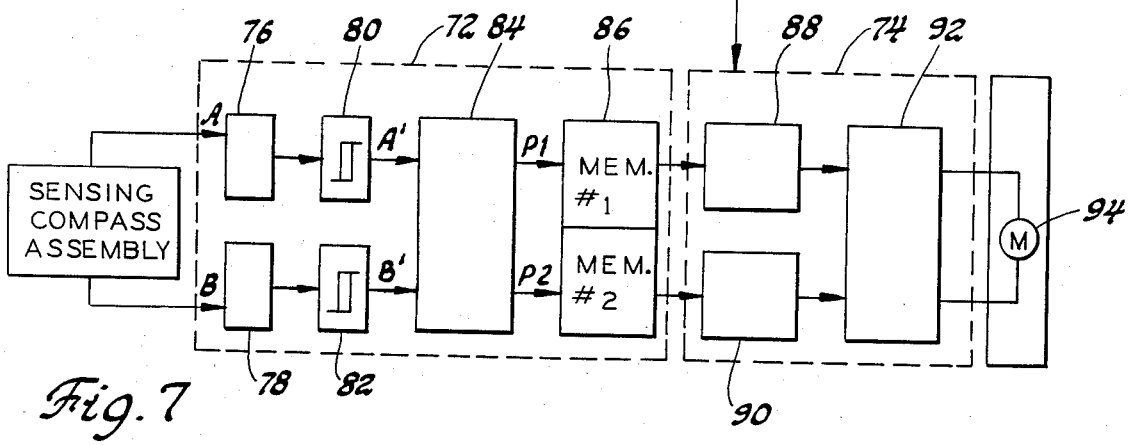
FIG. 7 is a block diagram of the electronic circuitry of the preferred apparatus.

Referring to FIG. 7, the compass assembly sends two signals to a detection means 72 having output to motor control means 74. Detection means 72 includes means 76 and 78 for adjusting the signal level to which detection means 72 will respond. Output signals from means 76 and 78 are then transmitted to circuitry 80 and 82 which provide hystereses to prevent unnecessary signals being sent to direction detector and pulse generator 84.

The output from pulse generator 84 provides direction error pulses to error memory 86. Memory 86 electronically contains all the necessary control signals for either increasing or reducing the direction error based on the directional pulses received from generator 84.

The circuits contained in generator 84 and memory 86 operate to: amplify the incoming signals from the sensing compass; discriminate between clockwise and counter-clockwise rotation of the sensor; produce direction error pulses to the memory control; and accumulate the number of error pulses.

The dark current (high resistance) to light current (low resistance) of the detectors determines the range of signal change presented to the first stage amplifier. The first stage amplifier is designed to produce a low voltage output (near ground) potential when the detector is receiving maximum illumination (low resistance). The detector signal that will produce a low output from the first stage amplifier is established by adjusting resistor values in the input and feedback network of the firt stage amplifier.

The gain of the second stage amplifier provided by means 80 and 82, is similarly adjusted, with resistor values, to produce a full voltage swing from logic low (ground) to logic high (supply voltage) as the detector signal changes from minimum voltage to maximum voltage.

The amplifcation stages are identical in operation for each of the two signals received from the sensing compass assembly. The first stage of amplification establishes the operating threshold for the range of signals received from the sensors. The second stage amplifies the output of the first stage to provide a voltage which will vary between logic ground and logic high for the range of signal received from the first stage.

The arrangement of the error memory and truth table is as follows:

| DIRECTION PULSE TRUTH TABLE 84 (Referring to FIG. 7) | | |
|---|---|---|
| Input | | Output |
| A' | B' | PULSE |
| H | HL | P1 |
| HL | L | P1 |
| L | LH | P1 |
| LH | H | P1 |
| H | LH | P2 |
| HL | H | P2 |
| L | HL | P2 |
| LH | L | P2 |

H = High = more than 70% Vss
L = Low = less than 30% Vss
HL = High to Low Transition
LH = Low to High Transition
Vss = Supply Voltage

| ERROR MEMORY TRUTH TABLE 86 (Referring to FIG. 7) | | | | | | |
|---|---|---|---|---|---|---|
| R | B1 | B2 | P1 | P2 | Mem #1 | Mem #2 |
| H | X | X | X | X | O | O |
| L | L | L | LH | L | CU | NC |
| L | H | L | LH | L | CU | NC |
| L | H | L | L | LH | CD | NC |
| L | L | L | L | LH | NC | CU |
| L | L | H | L | LH | NC | CU |
| L | L | H | LH | L | NC | CD |

X = Don't Care
H = High, L = Low
LH = Low to High Transition
HL = High to Low Transition
CU = Count Up, CD = Count Down
NC = No Change
B1 = L with MEM #1 = O
B2 = L with MEM #2 = O
R = Reset Motor control circuit 74 contains a two channel amplifier similar to a stereo power amplifier. The channels are referred to as right and left and are identical in operation, therefore, any discussion of the operation of a channel will also reflect the operation of the opposite channel.

Motor control circuit 74 includes a first stage signal amplifier 88, a second first stage signal amplifier stage 90 and a power amplification stage 92 to operate a permanent magnet motor 94. The method for controlling the speed of the motor is known as sample and hold feedback and is discussed later in the text.

Circuit 74 accepts an error signal from the direction memory and amplifys the signal to provide an output to the motor that is proportional to the error input. The motor is connected to the boat's steering actuator 18. Overload and short circuit protection is provided to prevent damage to the electronics as well as the wiring in the motor drive circuits.

The input to the first signal amplification stage is supplied through a variable resistor or potentiometer which allows adjustment of the final output voltage to the motor.

The first amplification stage is electronically coupled to the opposite amplification stage to prevent any signal causing simultaneous operation of both power drivers leading to erroneous operation of the system. The power drivers are placed across the power supply lines and determine the direction of rotation as well as the speed of the motor. The configuration of the final power driver stage is known as an "H" bridge and is best suited to applications where only one power supply is available.

Amplifier 74 contains components which store the amount of amplified error and uses this stored signal to modify the output of the opposite channel first stage. Also, the output of either the first or the second stage amplifiers is prevented from delivering a signal to the power output stage controlling the motor.

The first stage amplified signal also provides a charging voltage to a resistor-capacitor (R-C) network. The charge on this network is used to add input voltage to the opposite input when the first stage amplified signal drops below a threshold, near ground potential. The amount of this aiding signal that is applied to the opposite channel depends on the duration and amount of error applied to the first channel. The net effect of this operation is to cause the steering actuator to move toward its original position at a slightly faster rate than would otherwise occur if just a direction error was presented to the opposite channel. This operation reduces the tendency for the control to hunt or overshoot due to high speed or gain settings of the operator controlled speed setting.

The second stage amplifier accepts the signal from the first stage amplifier and a voltage feedback signal from the motor speed feedback network. The second stage amplifier serves to sum the input from the first stage and the motor speed signal. The speed signal, applied to a R-C network, is used to control the output of the second stage and acts to keep the motor speed proportional to the signal from the first stage even under varying motor load conditions.

The motor speed feedback network operates as a sample and hold circuit. The feedback network contains an oscillator electrically connected to the second stage signal amplifier and to a transistor connected to the motor drive output transistor bridge. In operation, the oscillator momentarily turns off the output of the second stage amplifier and turns on the feedback transistor. The transistor causes the motor generated voltage to be applied to the R-C network connected to the second stage summing point. The effect of the oscillator is to alternate between sampling the motor generated voltage and enabling the second stage to drive the power amplifier bridge. The sampling pulse generated by the oscillator is of relatively short duration compared to the total time period of the oscillator. The sample pulse time is set to be less than 10% of the oscillator period.

The output of the second stage amplifier is proportional to the signal from the first stage and the motor speed signal supplied from the feedback network. This signal is applied to a transistor which amplifies the power of the second stage to a level necessary to drive the transistors in the "H" bridge which control the direction and speed of the motor.

With a signal applied to the second stage amplifier, the output of the second stage begins to increase the drive command to the power amplifier. This causes the motor to increase in speed until such time as the feedback signal matches the command signal. Any decrease in signal applied to the second stage amplifier causes the second stage to reduce the drive command. The components in the feedback network are arranged such that when the input to the second stage is decreasing, the output of the stage is shut off for a period of time until the R-C network voltage matches the input voltage to the second stage. The effect of this circuit operaton is to cause the motor to stop when the error signal from the first stage is decreasing at a specific rate.

The operation of the motor control circuit causes the motor to run at a speed determined by the amount of error signal input to the first stage amplifier. A steady error will cause the motor to run at a steady speed. An increasing error will speed up the motor. A decreasing error signal will either slow down or stop the motor depending on the rate at which the error is decreasing. In the event the error signal from the first stage decreases to zero at a fast rate, the charge on the first stage R-C network will be large and cause the motor to reverse direction moving the actuator toward the original position. Should opposite error increase, the stored charge will aid the error signal thus reducing the tendency for hunting of the system.

Assuming the boat is turning to the left and the position of the light detectors are as shown in FIG. 5, detector 68 will change its output signal as it moves from an absorbing area to a reflecting area while the output signal of detector 70 remains relatively unchanged on a light absorbing surface. The compass drum is assumed to maintain a constant relationship with respect to magnetic north.

The detectors provide memory 86 with a left error pulse. Depending upon the previous contents of the memory, the pulse will either reduce any right error that has been accumulated or increase the left error.

The operation of the detectors and the memory is similar when the boat turns to the right, with the desired direction pulses generated and delivered to the memory.

The accumulated error in the memory develops an output that can be made to any convenient scaling system. Preferrably the error output of the memory produces a non-linear output versus accumulated error.

Remote operator control means 96 is connected to circuit 74 by connection 98 with which the operator may apply control signals to the amplifier system and override the automatic system to provide a new course change or to manually steer the vessel.

Having described my invention, I claim:

1. A control unit for an automatic steering apparatus, comprising:
   a base;
   a steering actuator mounted on the base;
   a support;
   gimbal means mounted on the base and supporting the support;
   a housng mounted on the support, the housing having transparent means on at least a partially cylindrical surface for transmitting light therethrough, and including dampening fluid in the housing;

a compass member rotatably disposed in the housng in a predetermined position with respect to the earth;

a drum having a cylindrical surface, the drum being disposed in the dampening fluid in the housing and being connected to the compass member so as to be rotatable therewith about a vertical axis of rotation in a first direction;

a plurality of reflective first stripes disposed around the cylindrical surface of the drum, parallel to one another but not parallel to said first direction, each of said first stripes having a predetermined, substantially identical width in said first direction;

second stripes of a lesser reflectivity than said first stripes, the second stripes having a substantially identical width and being disposed between the first stripes so as to define a plurality of parallel, substantially linear marginal edges between the first stripes and the second stripes;

first light source means for delivering a light ray through the transparent means on the housing toward said first and second stripes on the drum;

first light detector means for detecting light reflected from the drum transmitted from the first light source means, the first light source means and the first light detector means being mounted on the support outside the housing;

second light source means for delivering a light ray through the transparent means on the housng toward said first and second stripes on the drum;

second light detector means for detecting light reflected from the drum transmitted from the second light source means, the second light source means and the second light detector means being mounted on the support outside the housing;

an elongated first lens mounted on the support between the first light source means and the drum, the longitudinal axis of the first lens being disposed generally parallel to the linear marginal edges on the drum to form a light ray received from the first light source means into a first focal line on the drum, parallel to said marginal edges;

an elongated second lens mounted on the support betwen the second light source means and the drum, the longitudinal axis of the second lens being disposed generally parallel to the linear marginal edges on the drum to form a light ray received from the second light source means into a second focal line on the drum, parallel to said marginal edges;

the first light detector means being disposed on the support so as to be operative to detect the marginal edge separating one of said first stripes from a neighboring second stripe passing the first focal line at such times as the second light detector means detects the second focal line being reflected from a non-marginal portion of one of said stripes; and electronic means connected to the first light detector means and the second light detector means for transmitting a compensating steering signal to the steering actuator in response to relative motion between the marginal edges on the drum and said first focal line and said second focal line.

2. Means as defined in claim 1, including means for electronically resetting the memory to establish a new direction reference 3. A control unit as defined in claim 1, in which the light detector means and the electronic memory means are operative to discriminate between rotation of the drum in either a first direction with respect to the base or in the opposite, second direction, generally in accordance with the following Direction Pulse Truth Table and Error Memory Truth Table:

| DIRECTION PULSE TRUTH TABLE 84 | | |
|---|---|---|
| Input | | Output T. Memory |
| A' | B' | Pulse |
| H | HL | P1 |
| HL | L | P1 |
| L | LH | P1 |
| LH | H | P1 |
| H | LH | P2 |
| HL | H | P2 |
| L | HL | P2 |
| LH | L | P2 |

A' = filtered signal from first light dector means
B' = filtered signal from second light dector means
Pulse = P1 or P2
H = High = more than 70% Vss
L = Low = less than 30% Vss
HL = High to Low Transition
LH = Low to High Transition
VSS = Supply Voltage

| ERROR MEMORY TRUTH TABLE 86 | | | | | | |
|---|---|---|---|---|---|---|
| R | B1 | B2 | P1 | P2 | Mem #1 | Mem #2 |
| H | X | X | X | X | O | O |
| L | L | L | LH | L | CU | NC |
| L | H | L | LH | L | CU | NC |
| L | H | L | L | LH | CD | NC |
| L | L | L | L | LH | NC | CU |
| L | L | H | L | LH | NC | CU |
| L | L | H | LH | L | NC | CD |

X = Don't Care
H = High, L = Low
LH = Low to High transition
HL = High to Low Transition
CU = Count Up, CD = Count Down
NC = No Change
B1 = L with MEM #1 = 0
B2 = L with MEM #2 = 0
R = Reset 4. A control unit as defind in claim 1, including pulse generator means connected between the light detector means and the error memory so as to be operative to determine the direction of steering error and the amount of steering error according to the number of stripes passing the light detector means.

5. A control unit as defined in claim 7, including a steering member and in which the steering actuator is connected to the steering member and including power means and a circuit connected to the error memory means operative to cause the steering member to move at a rate which is in accordance with the duration and amount of error signal delivered by the error memory means, whereby an increase in error causes the steering correction rate to increase, and a decrease in error causes the steering correction rate to be reduced.

6. A control unit for an automatic steering apparatus, comprising:
a base;
a steering actuator mounted on the base;
a support;
a cylindrical housing mounted on the support, the housing having a cylindrical surface for viewing the interior of the housing, and including dampening fluid in the housing, a compass member rotatably disposed in the housng in a predetermined position with respect to the earth;

a drum having a cylindrical surface, the drum being disposed in the dampening fluid in the housing and being connected to the compass member so as to be movable therewith;

gimbal means mounted on the base and supporting the support and the drum such that the drum is rotatable about a vertical axis of rotation in a first direction of rotation, and the cylindrical surface of the drum is rotatable therewith;

the drum having a plurality of reflective first stripes disposed parallel to one another but not parallel to the direction of drum rotation, each of said first stripes having a predetermined width in said first direction of rotation, the drum having second stripes of a lesser reflectivity disposed between the first stripes;

first light source means for delivering a light ray toward the drum, and first light detector means for detecting light reflected from the stripes and transmitted from the first light source means;

second light source means for delivering a light ray toward the drum, and second light detector means for detecting light reflected from the drum and transmitted from the second light source means;

means supporting the second light source means and the first light source means such that the first light detector means is operative to detect light being reflected from the marginal edge between one of said first stripes and said second stripes at such times that the second light detector means detects light reflected from a non-marginal portion of said stripes to detect relative rotation between the light detector means and the drum;

error memory means;

pulse generator means connected to the light detector means so as to be operative to determine the direction of steering error and to provide direction steering pulses to the error memory means according to the number of marginal edges passing the light detector means;

the error memory means including a first memory and a second memory operative to retain the direction of rotation of the drum with respect to the base in either said first direction or the opposite, second direction according to the pulses received from the pulse generator means; and the error memory means being connected to the light detector means for transmitting a compensating error signal to the steering actuator depending upon the direction of relative rotation of the light detector means and the drum.

7. A control unit as defined in claim 6, in which the error memory means includes a remote control means connected such that the user can apply a new control direction to the error memory means to provide a new heading.

* * * * *